(12) United States Patent
Davydov et al.

(10) Patent No.: US 10,085,280 B2
(45) Date of Patent: *Sep. 25, 2018

(54) GROUP CARRIER SCHEDULING FOR UNLICENSED LONG TERM EVOLUTION NETWORK

(71) Applicant: Intel Corporation, Santa Clara, CA (US)

(72) Inventors: Alexei Vladimirovich Davydov, Nizhny Novgorod (RU); Vadim Sergeyevich Sergeyev, Nizhny Novgorod (RU); Shafi Bashar, Santa Clara, CA (US); Gregory Vladimirovich Morozov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,400

(22) Filed: Mar. 20, 2017

(65) Prior Publication Data
US 2017/0223727 A1 Aug. 3, 2017

Related U.S. Application Data

(63) Continuation of application No. 14/575,666, filed on Dec. 18, 2014, now Pat. No. 9,603,164.

(Continued)

(51) Int. Cl.
*H04W 72/12* (2009.01)
*H04L 27/26* (2006.01)
(Continued)

(52) U.S. Cl.
CPC ....... *H04W 72/1289* (2013.01); *H04L 1/1812* (2013.01); *H04L 5/001* (2013.01);
(Continued)

(58) Field of Classification Search
CPC ............... H04L 1/1812; H04L 27/0006; H04L 27/2613; H04L 5/001; H04L 5/0023;
(Continued)

(56) References Cited

U.S. PATENT DOCUMENTS

| 2010/0303011 A1* | 12/2010 | Pan ................... H04L 5/001 370/328 |
| 2012/0218952 A1* | 8/2012 | Kwon ................. H04W 72/042 370/329 |

(Continued)

FOREIGN PATENT DOCUMENTS

| CN | 106416117 A | 2/2017 |
| WO | WO-2016003614 A1 | 1/2016 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331, V. 10.12.0, (Dec. 2013), 26 pgs.

(Continued)

*Primary Examiner* — Robert Lopata
(74) *Attorney, Agent, or Firm* — Schwegman Lundberg & Woessner, P.A.

(57) ABSTRACT

A user equipment device comprises physical layer circuitry configured to communicate radio frequency (RF) electrical signals directly with one or more separate wireless devices, including to receive an indication of multiple component carriers aggregated into a carrier set that includes at least one scheduling component carrier and at least one scheduled component carrier, and receive scheduling control information for the multiple component carriers of the carrier set using the scheduling component carrier in downlink control information according to a resource radio control signaling protocol.

20 Claims, 7 Drawing Sheets

Related U.S. Application Data

(60) Provisional application No. 62/019,778, filed on Jul. 1, 2014.

(51) Int. Cl.

| | | |
|---|---|---|
| *H04L 1/18* | (2006.01) | |
| *H04L 5/00* | (2006.01) | |
| *H04L 27/00* | (2006.01) | |
| *H04W 16/14* | (2009.01) | |
| *H04W 72/04* | (2009.01) | |

(52) U.S. Cl.
CPC .......... *H04L 5/0032* (2013.01); *H04L 5/0044* (2013.01); *H04L 5/0053* (2013.01); *H04L 5/0091* (2013.01); *H04L 27/0006* (2013.01); *H04L 27/2601* (2013.01); *H04L 27/2613* (2013.01); *H04W 16/14* (2013.01); *H04W 72/042* (2013.01); *H04L 1/1822* (2013.01); *H04L 1/1896* (2013.01); *H04L 5/0023* (2013.01)

(58) Field of Classification Search
CPC ... H04L 5/0032; H04L 5/0053; H04L 5/0091; H04W 72/1289
USPC ......................................... 370/310, 328, 329
See application file for complete search history.

(56) References Cited

U.S. PATENT DOCUMENTS

| | | | |
|---|---|---|---|
| 2012/0263123 A1 | 10/2012 | Turtinen et al. | |
| 2012/0264468 A1* | 10/2012 | Turtinen ................. | H04L 5/001 455/509 |
| 2013/0016639 A1* | 1/2013 | Xu .......................... | H04L 5/001 370/311 |
| 2013/0058286 A1* | 3/2013 | Takeda ................ | H04W 72/042 370/329 |
| 2013/0070690 A1* | 3/2013 | Moon ..................... | H04L 5/001 370/329 |
| 2013/0094456 A1 | 4/2013 | Ng et al. | |
| 2013/0163447 A1* | 6/2013 | Koskela ................. | H04L 5/001 370/252 |
| 2013/0163543 A1 | 6/2013 | Freda et al. | |
| 2013/0170376 A1* | 7/2013 | Dinan .................... | H04W 72/12 370/252 |
| 2013/0286990 A1* | 10/2013 | Park ...................... | H04L 1/1861 370/329 |
| 2013/0315114 A1 | 11/2013 | Seo et al. | |
| 2013/0329686 A1 | 12/2013 | Kim et al. | |
| 2014/0036853 A1 | 2/2014 | Kim et al. | |
| 2014/0036881 A1* | 2/2014 | Kim ........................ | H04L 5/001 370/336 |
| 2014/0086167 A1 | 3/2014 | Seo et al. | |
| 2014/0098774 A1* | 4/2014 | Gao ........................ | H04L 5/001 370/329 |
| 2014/0112289 A1* | 4/2014 | Kim ...................... | H04W 16/14 370/329 |
| 2015/0055541 A1* | 2/2015 | Zhang ................. | H04W 72/005 370/312 |
| 2015/0099525 A1* | 4/2015 | Ji .......................... | H04W 72/04 455/450 |
| 2015/0131601 A1* | 5/2015 | Dinan .................... | H04W 72/12 370/329 |
| 2015/0139126 A1* | 5/2015 | Park .................. | H04W 52/0235 370/329 |
| 2015/0215097 A1* | 7/2015 | Yi ......................... | H04W 52/48 370/329 |
| 2015/0223075 A1* | 8/2015 | Bashar ................. | H04W 16/14 370/329 |
| 2015/0223244 A1* | 8/2015 | Tabet .................... | H04W 72/12 370/329 |
| 2015/0312888 A1* | 10/2015 | Li ....................... | H04W 76/021 370/329 |
| 2015/0365931 A1* | 12/2015 | Ng ........................ | H04L 1/1812 370/329 |
| 2016/0007373 A1 | 1/2016 | Davydov et al. | |
| 2016/0095093 A1* | 3/2016 | Yi ........................... | H04L 5/001 370/280 |
| 2017/0105218 A1* | 4/2017 | Tabet ................ | H04W 72/0453 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, (Mar. 2014), 356.

"U.S. Appl. No. 14/575,666, Non Final Office Action dated Jul. 14, 2016", 13 pgs.

"U.S. Appl. No. 14/575,666, Notice of Allowance dated Nov. 7, 2016", 8 pgs.

"U.S. Appl. No. 14/575,666, Response filed Oct. 13, 2016 to Non Final Office Action dated Jul. 14, 2016", 12 pgs.

"Chinese Application Serial No. 201580027643.8, Voluntary Amendment filed Jun. 9, 2017", w/ English translation and claims in English, 13 pgs.

"Cross Carrier Scheduling Scenarios for CC Specific TDD Configuration", Renesas Mobile Europe Ltd R1-113886, 3GPP TSG RAN WG1 Meeting #67, (Nov. 2011), 3 pgs.

"International Application Serial No. PCT/US2015/035144, International Preliminary Report on Patentability dated Jan. 12, 2017", 22 pgs.

"International Application Serial No. PCT/US2015/035144, International Search Report dated Sep. 23, 2015", 3 pgs.

"International Application Serial No. PCT/US2015/035144, Written Opinion dated Sep. 23, 2015", 9 pgs.

"3rd Generation Partnership Project; Technical Specification Group Radio Access Network; Evolved Universal Terrestrial Radio Access (E-UTRA); Multiplexing and channel coding (Release 12)", 3GPP Standard; 3GPP TS 36.212, 3rd Generation Partnership Project (3GPP), Mobile Competence Centre ; 650, Route des Lucioles ; F-06921 Sophia-Antipolis Cedex; France, vol. RAN WG1, No. V12.1.0, (Jun. 17, 2014), 1-89.

"3rd Generation Partnership Project; Technical Specification Group Radio Access Network; Evolved Universal Terrestrial Radio Access (E-UTRA); Radio Resource Control (RRC); Protocol specification (Release 12 )", 3GPP Standard; 3GPP TS 36.331, 3rd Generation Partnership Project (3GPP), Mobile Competence Centre ; 650, Route des Lucioles ; F-06921 Sophia-Antipolis Cedex ; France, vol. RAN WG2, No. V12.1.0 *Paragraph 5.5.5, Paragraph 5.6.3*, 1-356.

"European Application Serial No. 15815875.8, Extended European Search Report dated Feb. 1, 2018", 12 pgs.

"Japanese Application Serial No. 2016-571022, Office Action dated Dec. 19, 2017", w/ English translation, 9 pgs.

Hitachi Ltd, "Hitachi Perspectives on LTE-U", 3GPP workshop Jun. 13, 2014_LTE-U RWS-140017, [Online] Retrieved from the internet: <URL:http://www.3gpp.org/ftp/workshop/2014-06-13_LTE-U/Docs/RWS-140017.zip>, (Jun. 5, 2014).

Huawei, "Cell index for PCell", 3GPP Draft; R2-104896 Cell Index for PCell, 3rd Generation Partnership Project (3GPP), Mobile Competence Centre ; 650, Route des Lucioles ; F-06921 Sophia-Antipolis Cedex ; France, vol. RAN WG2, No. Madrid, Spain, (Aug. 17, 2010).

U.S. Appl. No. 14/575,666 now U.S. Pat. No. 9,603,164, filed Dec. 18, 2014, Group Carrier Scheduling for Unlicensed Long Term Evolution Network.

* cited by examiner

```
CrossCarrierSchedulingConfig-r10  ::=    SEQUENCE {
    schedulingCellInfo-r10           CHOICE {
        own-r10                          SEQUENCE {              -- No cross carrier
            cif-Presence-r10                 BOOLEAN
        },
        other-r10                        SEQUENCE {              -- Cross carrier
            schedulingCellId-r10             ServCellIndex-r10,
            pdsch-Start-r10                  INTEGER (1..4)
        }
    },
    ~~~
}

-- ASN1STOP
```

*Fig.2*

```
-- ASN1START

CrossCarrierSchedulingConfig-r13  ::=          SEQUENCE {
    schedulingCellInfo-r13         CHOICE {
        own-r13                    SEQUENCE {
            cif-Presence-r13       BOOLEAN
        },
        other-r13                  SEQUENCE {
            schedulingCellId-r13   ServCellIndex-r13,
            carrierIndicatorField-r13  INTERGER (5..7),
            pdsch-Start-r13        INTEGER (0..4)
        }
    }
}

-- ASN1STOP
```

*Fig.5*

GROUP CARRIER SCHEDULING FOR UNLICENSED LONG TERM EVOLUTION NETWORK

PRIORITY APPLICATION

This application is a continuation of U.S. application Ser. No. 14/575,666, filed Dec. 18, 2014, now issued as U.S. Pat. No. 9,603,164,which claims the benefit of priority to U.S. Provisional Application Ser. No. 62/019,778, filed Jul. 1, 2014, all of which are incorporated herein by reference in their entirety.

TECHNICAL FIELD

Embodiments pertain to transmitting voice data using radio access networks. Some embodiments relate to mobile telephone communication networks.

BACKGROUND

Radio access networks are used for delivering one or more of data communications, voice communications, and video communications to user equipment such as a cellular telephone or a smart phone. Some radio networks are packet switched networks and packetize information such as voice and video data when it is sent over the network. As the demand for communicating voice and video increases, quality of service can deteriorate as the radio access networks approach their peak capacity. Thus, there are general needs for devices, systems and methods that provide a robust protocol for communication with user equipment.

BRIEF DESCRIPTION OF THE DRAWINGS

FIG. 2 shows an example of a definition of information elements for radio resource control signaling for a long term evolution (LTE) network;

FIG. 5 shows an example of a definition of information elements for radio resource control signaling in accordance with some embodiments;

DETAILED DESCRIPTION

The following description and the drawings sufficiently illustrate specific embodiments to enable those skilled in the art to practice them. Other embodiments may incorporate structural logical electrical, process, and other changes. Portions and features of some embodiments may be included in, or substituted for, those of other embodiments. Embodiments set forth in the claims encompass all available equivalents of those claims.

Figure 1:
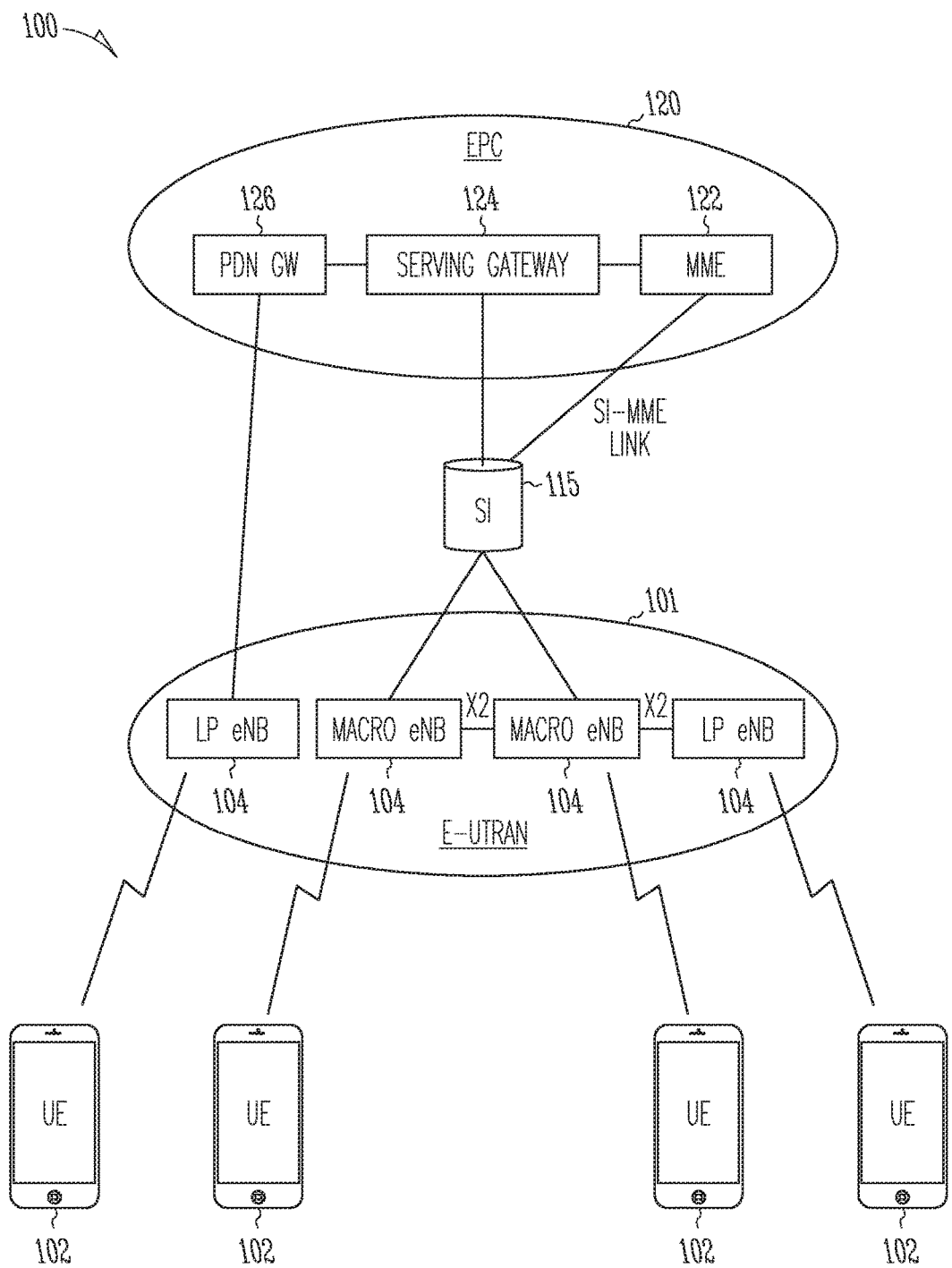
FIG. 1 shows an example of a portion of an end-to-end network architecture of an LTE network with various components of the network in accordance with some embodiments.

FIG. 1 shows an example of a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 101 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a microcell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. Two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and hybrid automatic repeat request (H-ARQ) information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of downlink control information (DCI) and the channel condition. There may be four or more different PDCCH formats defined in LTE with different numbers of CCEs (e.g., aggregation level, $L,=1, 2, 4,$ or 8).

As explained previously, the demand for communicating one or both of voice data and video data continues to increase. A RAN 101 may experience heavy communication traffic which can lead to adverse network effects such as communication latency for example. As shown in FIG. 1, a RAN can include UE devices and eNB devices such as LP eNBs and/or macro eNBs. To alleviate network traffic, network capacity can be added by providing communication capability to the RAN devices from networks that operate using a communication spectrum not licensed for use by the cellular network devices. Communication peaks may occur locally and the RAN serving the locality may experience peak demand. The locality may include a WiFi network for computing devices such as laptop computers and computer tablets, but the wireless cellular devices are not licensed to operate in the WiFi communication spectrum (e.g., communication channels of 2.4 gigahertz (GHz) or 5 GHz). According to some embodiments, the wireless cellular devices of a RAN (e.g., an LTE network) schedule communication time on the WiFi communication channel and communicate information using the WiFi communication spectrum unlicensed for operation of the device. Use of a network unlicensed to LTE network devices is sometimes referred to as unlicensed LTE (LTE-U) or a licensed assisted access (LAA) network.

To increase bandwidth of RF network communications, a cellular phone network may use carrier aggregation. In carrier aggregation, more than one carrier or channel is used by a network device to increase transmission bandwidth. Multiple uplink or downlink carriers can be bundled in contiguous or non-contiguous bands. A contiguous band refers to combining multiple adjacent frequency bands into one carrier or channel. A non-contiguous band refers to combining non-adjacent frequency bands into one carrier or channel. Aggregation of non-contiguous channels may need multiple transceivers in a single device (e.g., UE).

To extend an LTE platform into LTE-U, frequency bands of the LTE-U can be considered as available carriers for carrier aggregation. However, current LTE platforms do provide control signaling for implementing carriers in LTE-U. Any expansion of control signaling to implement LTE-U should provide backward compatibility with legacy network terminal devices.

Cross-carrier scheduling may be used to schedule communicated data (e.g., voice data or video data) across the aggregated carriers and to inform a network terminal device of the downlink data rates for the different component carriers. In cross-carrier scheduling, the scheduling and the resource may not be on the same carrier. Scheduling information may be communicated using a primary component carrier and data may be communicated with a secondary component carrier as the resource. The primary and secondary component carriers may correspond to different carriers and may be contiguous or non-contiguous.

The secondary component carriers may be handled by a Radio Resource Control (RRC) layer of a UE. The MAC circuitry may act as a multiplexing entity for the aggregated component carriers as they are activated or deactivated by MAC circuitry control elements. Users can be scheduled on the different component carriers. A UE might receive a PDCCH control channel on one carrier with a resource allocation for another carrier.

Currently, for an advanced long term evolution (LTE-A) network, cross carrier scheduling requires transmission of DCI for scheduling each of the component carriers. DCI is communicated in the PDCCH or by enhanced PDCCH. The DCI includes a carrier indicator field (CIF) indicating one serving cell or resource cell that is scheduled for PDSCH transmission. FIG. 2 shows an example of a definition of CrossCarrierConfigSchedulingConfig information elements for RRC signaling for an LTE-A network. In cross carrier scheduling, the physical cell identifier of the scheduling cell is configured by parametric scheduling CellId-r10. One scheduling cell may schedule PDSCH for one or more scheduled cells. To differentiate among different scheduling cells, the CIF of the DCI indicates a serving cell index. The value of CIF determines the index of the carrier that has been scheduled for PDSCH transmission. Currently, eight values may be supported by CIF to indicate up 8 possible carriers, but currently only five elements are used are used by LTE-A.

Figure 3:
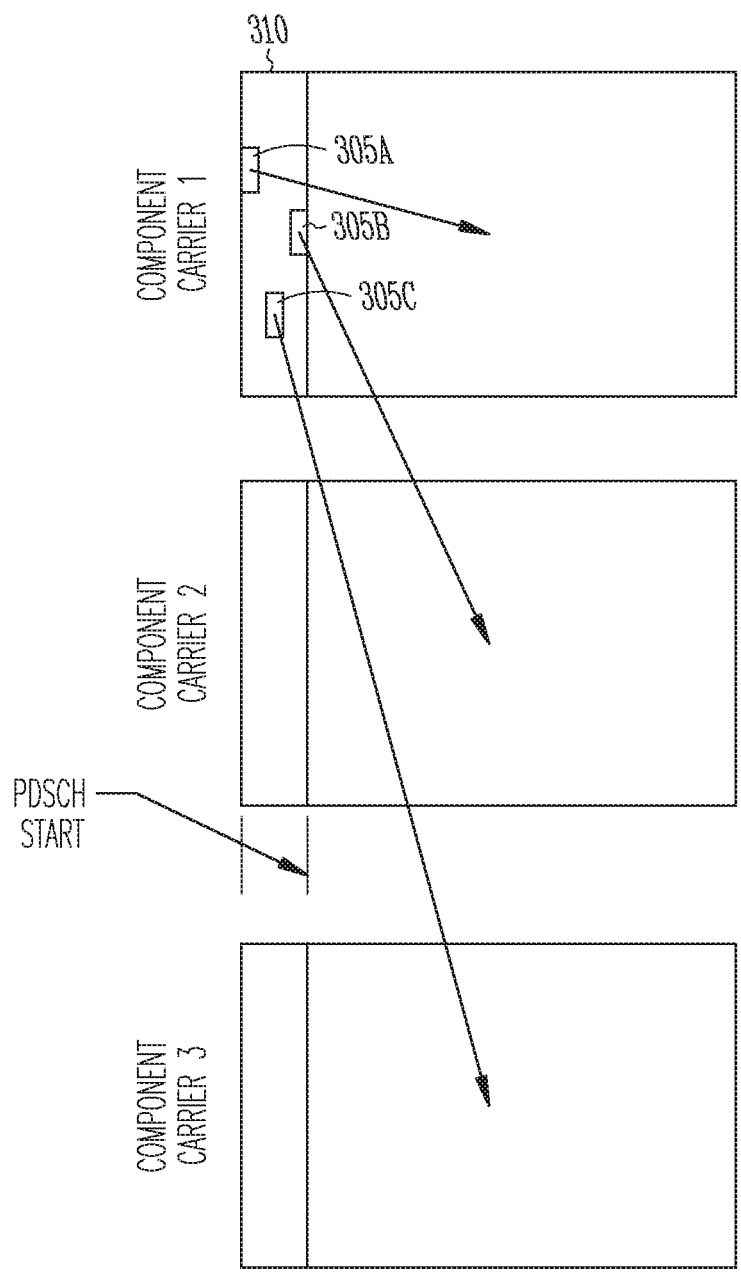
FIG. 3 shows a representation of cross-carrier scheduling in an LTE network.

If a higher order of carrier aggregation is desired (e.g., to expand component carriers into an unlicensed band), multiple PDCCH transmissions would be needed in the same sub-frame for the same UE. FIG. 3 shows a representation of cross-carrier scheduling in LTE-A. Component Carrier 1 includes the scheduling information, and shows PDCCH transmissions 305A, 305B, and 305C in the same sub-frame 310 to schedule Component Carrier 1, Component Carrier 3, and Component Carrier 2, respectively. However, transmitting multiple PDCCHs in a single sub-frame may be difficult (e.g., due to the likelihood of PDCCH blocking). To alleviate the need for the multiple PDCCH transmissions, the CIF can be expanded and moved to a different level of communication, thereby allowing for a single PDCCH transmission to schedule multiple component carriers and to schedule component carriers that are located in LTE-U space.

Figure 4:
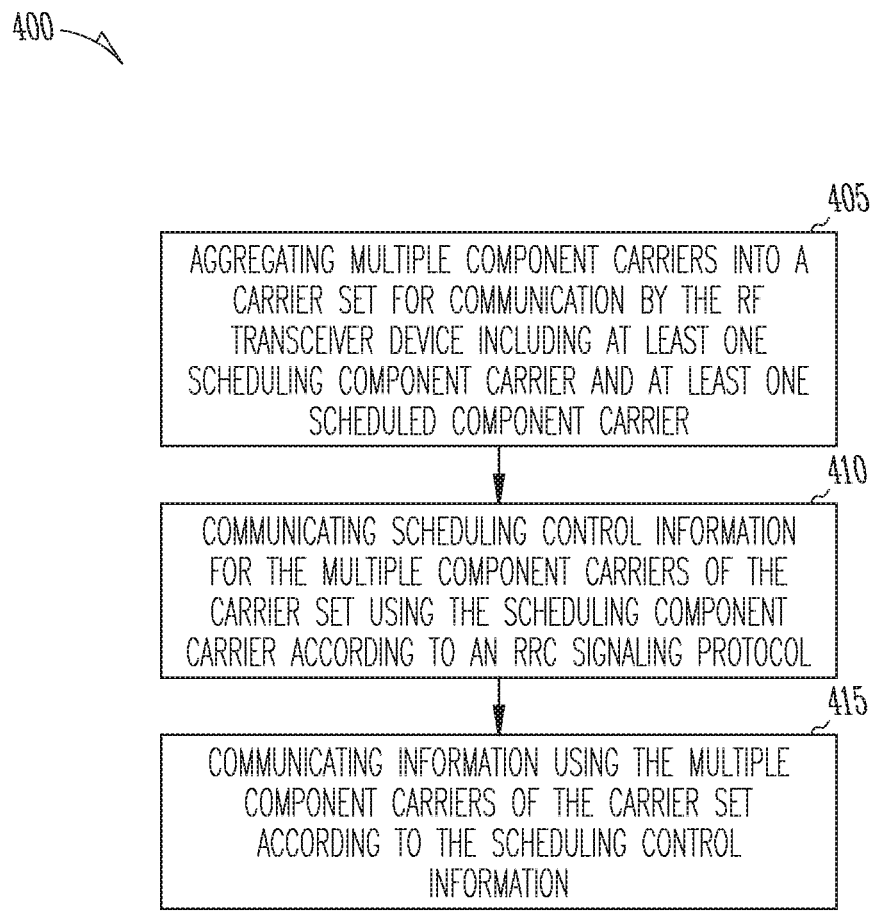
FIG. 4 shows a flow diagram of an example of a method of operating an RF transceiver device in accordance with some embodiments.

FIG. 4 shows a flow diagram of an example of a method 400 of operating an RF transceiver device of an end-to-end communication network. At 405, multiple component carriers are aggregated into a carrier set for communication by the RF transceiver device. The aggregated carriers include at least one scheduling component carrier and at least one scheduled component carrier. In certain embodiments, the scheduling component carrier is a primary component carrier and the scheduled component carrier is a secondary component carrier or a resource component carrier. There may be multiple scheduling component carriers and multiple scheduled component carriers used for the carrier aggregation.

At 410, scheduling control information for the multiple component carriers of the carrier set is communicated using the scheduling component carrier. The scheduling information is configured by a new RRC parameter in the RRC signaling protocol. The new parameter is an information element that indicates the value of the CIF that will be used to schedule PDSCH on the component carriers of the carrier set. FIG. 5 shows an embodiment of a definition of CrossCarrierConfigSchedulingConfig of information elements for RRC signaling. The component carriers with the same value of carrierIndicatorField-r13 determine the set of component carriers in the carrier set for simultaneous PDSCH scheduling. The carrierIndicatorField-r13 may take one value in the set {5, 6, 7} and defines the CIF value that will be used in the scheduling of the carrier set. There is no limitation on the maximum number of component carriers that can be configured with the same value of carrierIndicatorField-r13. This allows for an expansion of the schedule component carriers that may be scheduled, such as those that are located in LTE-U space.

Figure 6:
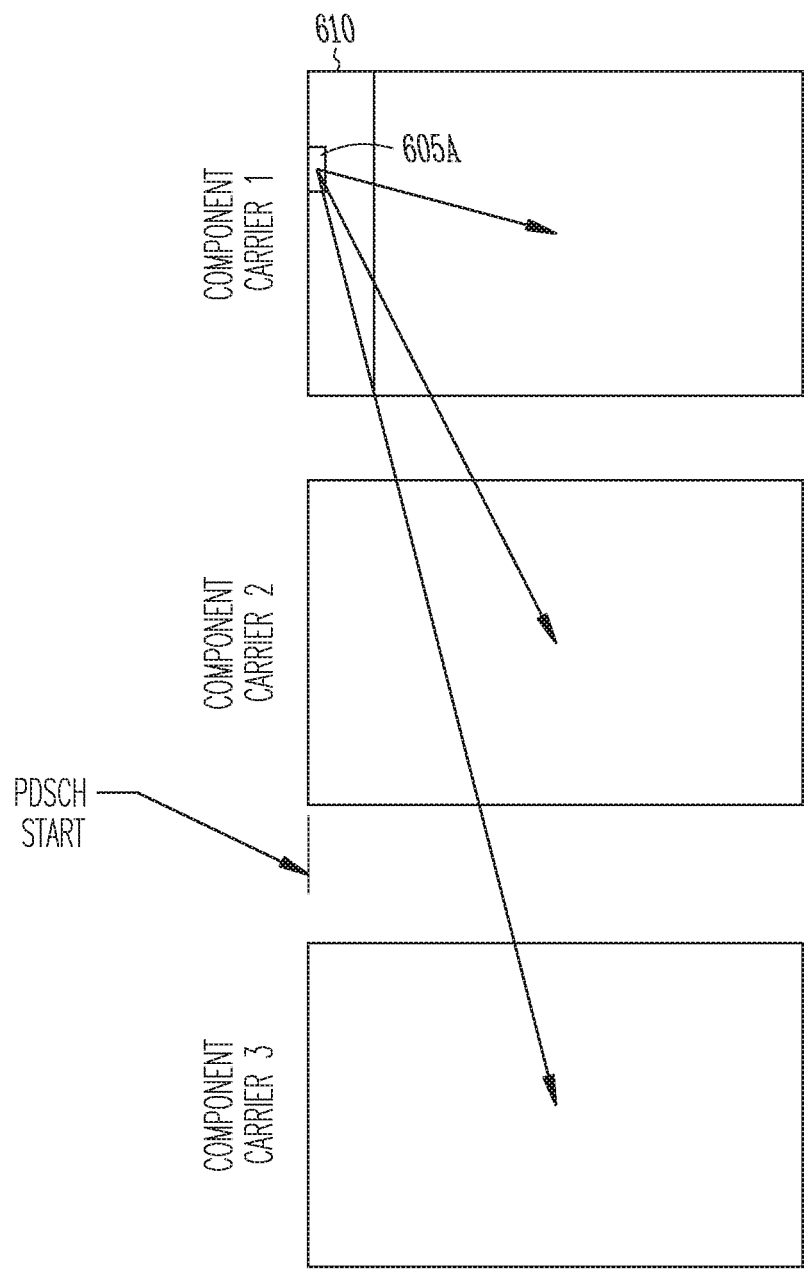
FIG. 6 illustrates a representation of cross-carrier scheduling in accordance with some embodiments.

Returning to FIG. 4 at 415, information is communicated using the multiple component carriers of the carrier set according to the scheduling control information. FIG. 6 illustrates a representation of cross-carrier scheduling according to some embodiments. Transmission of a single PDCCH 605A in one sub-frame 610 is able to schedule all of Component Carriers 1-3.

The embodiment of FIG. 5 also shows an extension of the PDSCH Start parameter in bits 0-4 of carrier scheduling. Currently in LTE networks (e.g., LTE-A), PDSCH transmission within a sub-frame can occupy OFDM symbols 1 to 13. Starting at OFDM symbol zero is not supported. As shown in the example of FIG. 2, a start of PDSCH is not allowed until the OFDM having symbol index 1. The embodiments of FIG. 5 and FIG. 6 show that the definition of PDSCH is extended to include transmission at symbol index 0. This means that a PDSCH transmission on an unlicensed spectrum can start from any OFDM symbol within a downlink sub-frame including an OFDM symbol with symbol index 0. This increases bandwidth in the unlicensed spectrum by allowing an increased number of time domain resources of the unlicensed spectrum to be used for PDSCH transmission.

Figure 7:
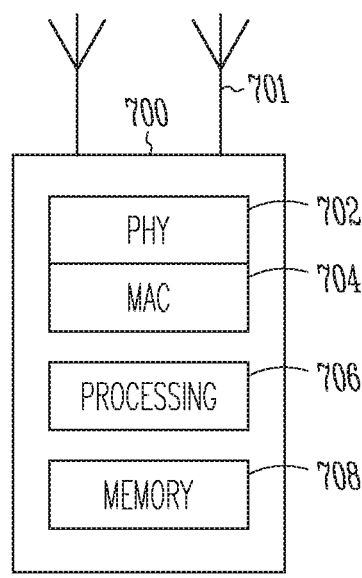
FIG. 7 illustrates a functional block diagram of user equipment in accordance with some embodiments.

FIG. 7 illustrates a functional block diagram of a UE in accordance with some embodiments. UE 700 may be suitable for use as UE 102 (FIG. 1). In some embodiments, the UE 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 700 may include one or more of a keyboard, a display, a non-volatile memory port, multiple antennas, a graphics processor, an application processor, speakers, and other mobile device elements. The display may be an LCD screen including a touch screen.

Although the UE 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

The UE 700 includes physical layer (PHY) circuitry 702 arranged to communicate radio frequency (RF) electrical signals directly with one or more separate wireless devices (e.g., eNBs 104 of FIG. 1) using one or more antennas 701 conductively coupled to the PHY circuitry 702. UE 700 may also include medium access control layer (MAC) circuitry 704 for controlling access to the wireless medium. The MAC circuitry 704 may be arranged to contend for a wireless medium to configure frames or packets for communicating over the wireless medium. UE 700 may also include processing circuitry 706 and memory 708 arranged to perform the operations described herein. The memory 708 may store information for configuring the processing circuitry 706 to perform operations of configuring and transmitting HEW frames and performing the various operations described herein.

In some embodiments, two or more antennas may be coupled to the physical layer circuitry arranged for sending and receiving signals. The antennas 701 utilized by the UE 700 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

The PHY circuitry 702 may include circuitry for modulation/demodulation, upconversion/downconversion, filtering, amplification, etc. In some embodiments, the processing circuitry 706 of the UE 700 may include one or more processors. The PHY circuitry 702 is arranged to receive an indication of multiple component carriers aggregated into a carrier set. The multiple component carriers include at least one scheduling component carrier and at least one scheduled component carrier. An example of a scheduled component carrier is a resource.

The PHY circuitry 702 also receives the scheduling control information for the multiple component carriers of the carrier set using the scheduling component carrier. In some embodiments, the scheduling information is included in DCI according to an RRC signaling protocol. In some embodiments, the scheduling information is included in a CIF of the DCI. The scheduling control information maps the certain physical channels to scheduled component carrier. The scheduling control information can also include configuration information for the scheduling component carriers and the scheduled component carriers.

Information is communicated using the multiple component carriers of the carrier set according to the scheduling control information. In some embodiments, the PHY circuitry 702 multiplexes the multiple components according to the scheduling control information. In some examples, the PHY circuitry 702 multiplexes the multiple components using a frequency band licensed to a long term evolution (LTE) network and at least one of a frequency band unlicensed to an LTE network (LTE-U) or a frequency band of a licensed assisted access (LAA) network. Resources not defined in the licensed LTE frequency band can be used to designate resources in the unlicensed frequency band. The scheduling control information may map the component carriers to unlicensed frequency bands. In certain embodiments, the scheduling control information includes resource allocation information (e.g., a mapping) that spans multiple scheduled component carriers of the carrier set.

In some embodiments, the UE 700 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) or an LTE communication network or a high speed downlink/uplink access (HSDPA/HSUPA) communication network, although the scope of the invention is not limited in this respect. In these broadband multicarrier embodiments, the UE 700 and the eNBs may be configured to communicate in accordance with an orthogonal frequency division multiple access (OFDMA) technique. In some embodiments, the OFDMA technique may be either a frequency domain duplexing (FDD) technique that uses different uplink and downlink spectrum or a time-domain duplexing (TDD) technique that uses the same spectrum for uplink and downlink.

The first OFDM symbol in a scheduling component carrier may be reserved for PDCCH. In some embodiments, the first OFDM symbol of a scheduled component carrier may be included in a PDSCH. As explained above, the new RRC parameter allows for the OFDM symbol with index zero of a downlink sub-frame to be included in the PDSCH.

Enhanced physical downlink control channel (EPDCCH) is a way to increase the control channel capacity. Additional control information can be included beyond the PDCCH sub-frame, such as by including enhanced CCEs in the PDSCH. In some embodiments, the scheduling information included in the DCI indicates that a first OFDM symbol of a downlink sub-frame of the at least one scheduled component carrier is included in an EPDCCH. Because the OFDM symbol with symbol index of zero is available, OFDM symbol zero can be included in the EPDCCH.

As explained previously, DCI in PDCCH informs the UE about the transport format, resource allocation, and hybrid automatic repeat request (H-ARQ) information related to the downlink shared channel. Because one DCI sent in PDCCH may include control information for multiple component carriers in the carrier set, the control parameters in the DCI may be common for multiple PDSCHs. For instance, the multiple PDSCHs may have the same value of the H-ARQ process number indicated in the DCI. In another example, the multiple PDSCHs may have the same modulation and coding scheme (MCS) indicated in the DCI. In yet another example, the resource allocation indicated in DCI may be the same for the set of component carriers.

The several examples provided describe cellular devices accessing unlicensed radio access network resources in order to increase capacity of the cellular device network. The mechanisms of LTE networks are enhanced to expand into the unlicensed communication space.

ADDITIONAL NOTES AND EXAMPLES

Example 1 can include subject matter (such as user equipment (UE)) comprising physical layer circuitry configured to communicate radio frequency (RF) electrical signals directly with one or more separate wireless devices, including to: receive an indication of multiple component carriers aggregated into a carrier set that includes at least one scheduling component carrier and at least one scheduled component carrier; and receive scheduling control information for the multiple component carriers of the carrier set using the scheduling component carrier in downlink control information (DCI) according to a resource radio control (RRC) signaling protocol.

In Example 2, the subject matter of Example 1 optionally includes physical layer circuitry configured to multiplex communication among the multiple component carriers of the carrier set according to the scheduling control information using a frequency band licensed to a long term evolution (LTE) network and at least one of a frequency band unlicensed to an LTE network (LTE-U) or a frequency band of a licensed assisted access (LAA) network.

In Example 3, the subject matter of one or both of Examples 1 and 2 optionally include processing circuitry configured to receive the scheduling control information from a carrier indicator field (CIF) of the DCI according to the RRC signaling protocol.

In Example 4, the subject matter of one or any combination of Examples 1-3 optionally include scheduling control information having configuration information for the at least one scheduling component carrier and the at least one scheduled component carrier of the carrier set.

In Example 5, the subject matter of one or any combination of Examples 1-4 optionally include scheduling control information that indicates that a first orthogonal frequency division multiplexing (OFDM) symbol of the at least one scheduled component carrier is included in a physical downlink shared channel (PDSCH), and wherein the first OFDM symbol is reserved in the scheduling component carrier for a physical downlink control channel (PDCCH)

In Example 6, the subject matter of one or any combination of Examples 1-5 optionally includes scheduling information that indicates a start of a PDSCH at an OFDM symbol having symbol index zero in the downlink sub-frame of the scheduled component carrier.

In Example 7, the subject matter of one or any combination of Examples 1-6 optionally includes the scheduling information that indicates that a first OFDM symbol of a downlink sub-frame of the at least one scheduled component carrier is included in an enhanced physical downlink control channel (EPDCCH).

In Example 8, the subject matter of one or any combination of Examples 1-7 optionally includes at least one scheduled component carrier of the carrier set having a plurality of scheduled component carriers in the carrier set, and wherein the scheduling control information includes a resource allocation that spans multiple scheduled component carriers of the carrier set.

In Example 9, the subject matter of one or any combination of Examples 1-8 optionally includes processing circuitry configured to receive an indication that a plurality of PDSCHs are scheduled for a plurality of scheduled component carriers, wherein the scheduled plurality of PDSCHs have a same value of a hybrid automatic repeat request (H-ARQ) process number indicated in the DCI.

In Example 10, the subject matter of one or any combination of Examples 1-9 optionally includes the scheduled PDSCHs having a same modulation and coding scheme (MCS) indicated in the DCI.

In Example 11, the subject matter of one or any combination of Examples 1-10 optionally includes physical layer circuitry is configured to: communicate with at least one of a network node device or another UE using a frequency band licensed to a long term evolution (LTE) network; and to communicate with an access point device or a network station device using at least one of a frequency band unlicensed to an LTE network (LTE-U) or a frequency band of a licensed assisted access (LAA) network.

In Example 12, the subject matter of one or any combination of Examples 1-11 optionally includes a plurality of antennas conductively coupled to the physical layer circuitry.

Example 13 can include subject matter (such as a method, a means for performing acts, or a machine-readable medium including instructions that, when performed by the machine, cause the machine to perform acts), or can optionally be combined with the subject matter of one or any combination of Examples 1-12 to include such subject matter, comprising aggregating multiple component carriers into a carrier set for communication by the RF transceiver device including at least one scheduling component carrier and at least one scheduled component carrier, communicating scheduling control information for the multiple component carriers of the carrier set using the scheduling component carrier in downlink control information (DCI) according to a resource radio control (RRC) signaling protocol, and communicating information using the multiple component carriers of the carrier set according to the scheduling control information.

In Example 14, the subject matter of Example 13 can optionally include communicating information using the scheduling component carrier via a frequency band licensed to a long term evolution (LTE) network and communicating using the at least one scheduled component carrier via one or both of a frequency band unlicensed to a long term evolution network (LTE-U) and a frequency band of a licensed assisted access (LAA) network.

In Example 15, the subject matter of one or both of Examples 13 and 14 optionally includes communicating an indication of the at least one scheduled component carrier using a carrier indicator field (CIF) of the DCI.

In Example 16, the subject matter of Examples 13-15 optionally includes configuring the at least one scheduling component carrier and the at least one scheduled component carrier according to the scheduling control information received using the RRC signaling protocol.

In Example 17, the subject matter of one or any combination of Examples 13-16 optionally includes scheduling a first orthogonal frequency division multiplexing (OFDM) symbol of the at least one scheduled component carrier for a physical downlink shared channel (PDSCH), wherein the first OFDM symbol is reserved in the scheduling component carrier for a physical downlink control channel (PDCCH).

In Example 18, the subject matter of one or any combination of Examples 13-18 optionally includes scheduling a start of a PDSCH at an OFDM symbol having symbol index zero in a downlink sub-frame of the scheduled component carrier.

In Example 19, the subject matter of one or any combination of Examples 13-18 optionally includes including scheduling a first OFDM symbol of a downlink sub-frame of the at least one scheduled component carrier for an enhanced physical downlink control channel (EPDCCH).

In Example 20, the subject matter of one or any combination of Examples 13-19 optionally includes a plurality of scheduled component carriers in the carrier set, wherein communicating the scheduling control information includes indicating a resource allocation that spans multiple scheduled component carriers of the carrier set.

In Example 21, the subject matter of one or any combination of Examples 13-20 optionally includes scheduling, using the scheduling component carrier, a plurality of PDSCHs for a plurality of scheduled component carriers, wherein the scheduled plurality of PDSCHs of the plurality of scheduled component carriers include a same value of a hybrid automatic repeat request (H-ARQ) process number indicated in the downlink control information.

In Example 22, the subject matter of one or any combination of Examples 13-21 optionally includes the scheduled plurality of PDSCHs, of the plurality of scheduled component carriers, including a same modulation and coding scheme (MCS) indicated in the DCI.

In Example 23, the subject matter of one or any combination of Examples 13-22 optionally includes communicating the scheduling control information to user equipment (UE) using a cellular network node device.

In Example 24, the subject matter of one or any combination of Examples 13-23 optionally includes including communicating, according to the scheduling information, with at least one of a network node device or another UE using a frequency band licensed to a long term evolution (LTE) network; and communicating with an access point device or a network station device using at least one of a frequency band unlicensed to an LTE network (LTE-U) or a frequency band of a licensed assisted access (LAA) network.

Example 25 can include subject matter, or can optionally be combined with the subject matter of one or any combination of Examples 1-24 to include such subject matter, such as a computer readable storage medium including instructions that when performed by hardware processing circuitry of a wireless communication device cause the wireless communication device to aggregate multiple component carriers into a carrier set for communication by the RF transceiver device, including at least one scheduling component carrier and at least one scheduled component carrier; communicate scheduling control information for the multiple component carriers of the carrier set in downlink control information (DCI) according to a resource radio control (RRC) signaling protocol; communicate information using the multiple component carriers of the carrier set according to the scheduling control information.

In Example 26, the subject matter of Example 25 optionally includes instructions that when executed by the hardware processing circuitry cause the wireless communication device to communicate information using the scheduling component carrier via a frequency band licensed to a long term evolution (LTE) network and communicate information using the at least one scheduled component carrier via one or both of a frequency band unlicensed to a long term evolution network (LTE-U) and a frequency band of a licensed assisted access (LAA) network.

In Example 27, the subject matter of one or both of Examples 25 and 26 optionally include instructions that when executed by the hardware processing circuitry cause the wireless communication device to schedule an orthogonal frequency division multiplexing (OFDM) symbol of the scheduled component carrier having symbol index zero for a physical downlink shared channel (PDSCH), and reserve the first OFDM symbol of the scheduling component carrier for a physical downlink control channel (PDCCH).

In Example 28, the subject matter of one or any combination of Examples 25-27 optionally includes instructions that when executed by the hardware processing circuitry cause the wireless communication device to schedule a first OFDM symbol of a downlink sub-frame of the at least one scheduled component carrier for an enhanced physical downlink control channel (EPDCCH).

Example 29 can include, or can optionally be combined with any portion or combination of any portions of any one or more of Examples 1-28 to include, subject matter that can include means for performing any one or more of the functions of Examples 1-28, or a machine-readable medium including instructions that, when performed by a machine, cause the machine to perform any one or more of the functions of Examples 1-28.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus of a user equipment (UE) configured to perform frequency carrier aggregation using a frequency band licensed to a first communication network and at least one of a frequency band unlicensed to the first communication network or a frequency band of a licensed assisted access (LAA) network, the apparatus comprising:
   memory; and processing circuitry configured to:

decode a carrier indicator field (CIF) of a scheduling component carrier, wherein a CIF value identifies multiple component carriers for simultaneous scheduling, including component carriers of the at least one of the frequency band unlicensed to the first communication network or the frequency band of the LAA network, wherein all component carriers having the same CIF value are identified for the simultaneous scheduling; and decode scheduling control information for the multiple component carriers of the carrier set using the scheduling component carrier in downlink control information (DCI) according to a resource radio control (RRC) signaling protocol.

2. The apparatus of claim 1, wherein the at least one scheduling component carrier includes scheduling control information for component carriers for the frequency band licensed to the first communication network and a frequency band of a WiFi network unlicensed to the first communication network.

3. The apparatus of claim 1, wherein component carriers with the same value in the CIF identify the set of component carriers in the carrier set for simultaneous scheduling of physical downlink shared channels (PDSCHs).

4. The apparatus of claim 1, wherein the scheduling control information includes configuration information for the at least one scheduling component carrier and the at least one scheduled component carrier of the carrier set.

5. The apparatus of claim 1, wherein the scheduling control information indicates that a first orthogonal frequency division multiplexing (OFDM) symbol of the at least one scheduled component carrier is included in a physical downlink shared channel (PDSCH), and. wherein the first OFDM symbol has a symbol index zero in the downlink sub-frame of the scheduled component carrier.

6. The apparatus of claim 1, wherein the at least one scheduled component carrier of the carrier set includes a plurality of scheduled component carriers in the carrier set, and wherein the scheduling control information includes a resource allocation that sp, multiple scheduled component carriers of the carrier set.

7. The apparatus of claim 1, wherein the processing circuitry is further configured to receive an indication that a plurality of PDSCHs are scheduled for a plurality of scheduled component carriers, wherein the scheduled plurality of PDSCHs have a same modulation and coding scheme (MCS) indicated in the DCI.

8. The apparatus of claim 1, including physical layer circuitry configured to multiplex communication among multiple component carriers using the frequency band licensed to a first communication network and the at least one of the frequency hand unlicensed to the first communication network or the frequency band of the LAA network.

9. The apparatus of claim 1, wherein the processing circuitry is configured to store the scheduling control information in the memory.

10. A method of operating an RE transceiver device of an end-to-end communication network, the method comprising:

decoding a carrier indicator field (CIF) of a scheduling component carrier, wherein a CIF value identifies multiple component carriers for simultaneous scheduling, including component carriers of one or both of a frequency band unlicensed to the first communication network and a frequency band of a licensed assisted access (LAA) network;

aggregating all component carriers having the same CIF value into a carrier set for communication by the RE transceiver device;

communicating scheduling control information for the multiple component carriers of the carrier set using the scheduling component carrier in downlink control information (DCI) according to a resource radio control (RRC) signaling protocol; and communicating information using the multiple component carriers of the carrier set according to the scheduling control information including communicating using the scheduling component carrier via a frequency band licensed to the end-to-end communication network and communicating using at least one scheduled component carrier via one or both of the frequency hand unlicensed to the end-to-end communication network and the frequency band of the LAA network.

11. The method of claim 10 wherein the at least one scheduling component carrier includes scheduling control information for component carriers for both of the frequency band licensed to the first communication network and a frequency band of a WiFi network unlicensed to the first communication network.

12. The method of claim 10, wherein component carriers with the same value in the CIF identify the set of component carriers in the carrier set for simultaneous PDSCH scheduling.

13. The method of claim 10, including configuring the at least one scheduling component carrier and the at least one scheduled component carrier according to the scheduling control information received using the RRC signaling protocol.

14. The method of claim 10, including scheduling a first orthogonal frequency division multiplexing (OFDM) symbol of the at least one scheduled component carrier for a physical downlink shared channel (PDSCH), and wherein the first OFDM symbol has a symbol index zero in the downlink sub-frame of the scheduled component carrier.

15. The method of claim 10, including scheduling a first OFDM symbol of a downlink sub-frame of the at least one scheduled component carrier for an enhanced physical downlink control channel (EPDCCH).

16. The method of claim 10, wherein the at least one scheduled component carrier of the carrier set includes a plurality of scheduled component carriers in the carrier set, wherein communicating the scheduling control information includes indicating a resource allocation that spans multiple scheduled component carriers of the carrier set.

17. A non-transitory computer readable storage medium including instructions that when executed by hardware processing circuitry of a wireless communication device cause the wireless communication device to:

decode a carrier indicator field (CIF) of a scheduling component carrier, wherein a CIF value identifies multiple component carriers for simultaneous scheduling, including component carriers of one or both of a frequency band unlicensed to the first communication network and a frequency band of a licensed assisted access (LAA) network;

aggregate all component carriers having the same CIF value into a carrier set for communication by the RF transceiver device;

communicate scheduling control information for the multiple component carriers of he carrier set in downlink control information (DCI) according to a resource radio control (RRC) signaling protocol; and communicate information using the multiple component carriers of the carrier set according to the scheduling control information including communicating using the scheduling component carrier via a frequency hand licensed to the end-to-end communication network and communicating using at least one scheduled component carrier via one or both of the frequency band unlicensed to the end-to-end communication network and the frequency hand of the LAA network.

18. The non-transitory computer readable storage medium of claim 17, including instructions that cause the processing circuitry to communicate an indication of the at least one scheduled component carrier using a carrier indicator field CIF) of the DCI.

19. The non-transitory computer readable storage medium 17, including instructions that cause the processing circuitry to configure the at least one scheduling component carrier and the at least one scheduled component carrier according to the scheduling control information received using the RRC signaling protocol.

20. The non-transitory computer readable storage medium of claim 17, including instructions that cause the processing circuitry to aggregate multiple component carriers into a carrier set for communication by the RE transceiver device, including a plurality of scheduled component carriers in the carrier set, wherein communicating the scheduling control information includes indicating a resource allocation that spans multiple scheduled component carriers of the carrier set.

\* \* \* \* \*

UNITED STATES PATENT AND TRADEMARK OFFICE
CERTIFICATE OF CORRECTION

PATENT NO. : 10,085,280 B2
APPLICATION NO. : 15/463400
DATED : September 25, 2018
INVENTOR(S) : Davydov et al.

It is certified that error appears in the above-identified patent and that said Letters Patent is hereby corrected as shown below:

In the Claims

In Column 13, Line 34, in Claim 5, delete "and." and insert --and-- therefor

In Column 13, Line 41, in Claim 6, delete "sp," and insert --spans-- therefor

In Column 13, Line 53, in Claim 8, delete "hand" and insert --band-- therefor

In Column 13, Line 58, in Claim 10, delete "RE" and insert --RF-- therefor

In Column 14, Line 2, in Claim 10, delete "RE" and insert --RF-- therefor

In Column 14, Line 17, in Claim 10, delete "hand" and insert --band-- therefor

In Column 14, Line 19, in Claim 11, after "claim 10", insert --,--

In Column 14, Line 65, in Claim 17, delete "he" and insert --the-- therefor

In Column 15, Line 4, in Claim 17, delete "hand" and insert --band-- therefor

In Column 15, Line 9, in Claim 17, delete "hand" and insert --band-- therefor

In Column 15, Line 14, in Claim 18, delete "CIF)" and insert --(CIF)-- therefor

In Column 15, Line 15, in Claim 19, after "medium", insert --of claim--

In Column 15, Line 24, in Claim 20, delete "RE" and insert --RF-- therefor

Signed and Sealed this
Eleventh Day of June, 2019

Andrei Iancu
*Director of the United States Patent and Trademark Office*